(12) United States Patent
Wu et al.

(10) Patent No.: US 12,456,208 B2
(45) Date of Patent: Oct. 28, 2025

(54) 3D SENSING SYSTEM AND METHOD

(71) Applicant: HIMAX TECHNOLOGIES LIMITED, Tainan (TW)

(72) Inventors: Min-Chian Wu, Tainan (TW); Pen-Hsin Chen, Tainan (TW); Ching-Wen Wang, Tainan (TW); Cheng-Che Tsai, Tainan (TW); Ting-Sheng Hsu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 660 days.

(21) Appl. No.: 17/816,424

(22) Filed: Jul. 31, 2022

(65) Prior Publication Data

US 2024/0037767 A1 Feb. 1, 2024

(51) Int. Cl.
*G06T 7/521* (2017.01)
*G01B 11/25* (2006.01)
*G02F 1/29* (2006.01)

(52) U.S. Cl.
CPC ............ *G06T 7/521* (2017.01); *G01B 11/254* (2013.01); *G02F 1/29* (2013.01)

(58) Field of Classification Search
CPC ... G06T 7/521; G01B 11/254; G01B 11/2513; G01B 11/22; G02F 1/29; H04N 13/204; H04N 9/3161; H04N 13/271; H04N 13/363
See application file for complete search history.

(56) References Cited

U.S. PATENT DOCUMENTS

| | | | |
|---|---|---|---|
| 2018/0218509 A1 | 8/2018 | Price et al. | |
| 2019/0035099 A1 | 1/2019 | Ebrahimi Afrouzi et al. | |
| 2019/0087969 A1 | 3/2019 | Shpunt et al. | |
| 2019/0295279 A1* | 9/2019 | Wang | G01B 11/2518 |
| 2020/0035170 A1* | 1/2020 | Shi | G09G 3/3426 |
| 2021/0035267 A1* | 2/2021 | Keh | G06T 7/521 |
| 2021/0201519 A1* | 7/2021 | Nash | G06V 20/64 |
| 2021/0203894 A1* | 7/2021 | Lu | H04N 9/3105 |
| 2021/0264625 A1* | 8/2021 | Atanassov | G06T 7/521 |
| 2022/0383476 A1* | 12/2022 | Varekamp | G06T 9/00 |

FOREIGN PATENT DOCUMENTS

| | | |
|---|---|---|
| CN | 112868225 A | 5/2021 |
| TW | 202124908 A | 7/2021 |
| TW | 202125040 A | 7/2021 |

* cited by examiner

*Primary Examiner* — Oneal R Mistry
*Assistant Examiner* — Jongbong Nah
(74) *Attorney, Agent, or Firm* — CKC & Partners Co., LLC

(57) ABSTRACT

A 3D sensing system including a liquid crystal lens, a projector, an image sensor and a circuit. The projector provides a light beam to the liquid crystal lens which applies a pattern to the light beam to generate a structured light. The image sensor captures an image corresponding to the structured light. The circuit calculates first depth information according to the pattern and the image, and determines if the image satisfies a quality requirement. If the image does not satisfy the quality requirement, the pattern is modified and another image is captured for calculating second depth information. The first and second depth information are combined to generate a depth map.

19 Claims, 7 Drawing Sheets

3D SENSING SYSTEM AND METHOD

BACKGROUND

Field of Invention

The present disclosure is related to a system and a method for sensing depth information through structured light.

Description of Related Art

The principle of active 3D sensing is projecting a light beam to an object to be sensed, and then calculating depth values according to the information reflected to a sensor. However, because of material and structure of the object to be sensed, some areas of the object may not be illuminated by the light beam, so the depth value cannot be calculated.

SUMMARY

Embodiments of the present disclosure provide a 3D (3 dimensions) sensing system including a liquid crystal lens, a projector, an image sensor and a circuit. The projector is configured to provide a light beam to the liquid crystal lens which applies a first pattern to the light beam to generate a first structured light. The image sensor is configured to capture a first image corresponding to the first structured light. The circuit is electrically connected to the image sensor, the liquid crystal lens, and the projector. The circuit is configured to calculate first depth information according to the first pattern and the first image, and determine if the first image satisfies a quality requirement. If the first image does not satisfy the quality requirement, the circuit is configured to control the liquid crystal lens such that the liquid crystal lens applies a second pattern to the light beam to generate a second structured light. The image sensor is configured to capture a second image corresponding to the second structured light. The second pattern is different from the first pattern. The circuit is configured to calculate second depth information according to the second pattern and the second image, and combine the first depth information and the second depth information to generate a depth map.

In some embodiments, the circuit is further configured to calculate first brightness of the first image, and calculate a difference between the first brightness and a brightness of a previous image. If the difference is greater than a threshold, the circuit is configured to determine that the first image does not satisfy the quality requirement.

In some embodiments, the circuit is further configured to determine that the first image does not satisfy the quality requirement if brightness of the first image is greater than a high threshold or less than a low threshold.

In some embodiments, the first image includes multiple sensing areas, each of the sensing areas includes multiple dots, and the first pattern includes multiple first dots. The circuit is configured to match the sensing areas and the first dots to calculate a depth value corresponding to each of the dots. For each of the sensing areas, the circuit is configured to determine if the sensing area is decoded successfully according to the corresponding depth values, and accordingly calculate a decoded rate of the first image. If the decoded rate is less than a first threshold, the circuit is configured to determine that the first image does not satisfy the quality requirement.

In some embodiments, for each of the sensing areas, the circuit is configured to calculate a degree of difference according to the corresponding depth values. If the degree of difference is greater than a second threshold, the circuit is configured to determine that the corresponding sensing area is not decoded successfully.

In some embodiments, the circuit is configured to divide a number of the sensing areas which are decided successfully by a number of all of the sensing areas to calculate the decoded rate.

In some embodiments, the circuit is configured to divide the second pattern into multiple second areas which corresponding to the sensing areas respectively. The circuit is configured to distribute multiple dots in the second pattern such that a dot density of the second area corresponding to the sensing area which is decoded successfully is more than a dot density of the second area corresponding to the sensing area which is not decoded successfully.

In some embodiments, the circuit is configured to store multiple predetermined patterns in a storage unit, and the first pattern and the second pattern are two of the predetermined patterns. When the first image does not satisfy the quality requirement, the circuit is configured to select one of the predetermined patterns as the second pattern.

In some embodiments, the first pattern includes multiple first dots. When the first image does not satisfy the quality requirement, the circuit is configured to shift or rotate the first dots to generate the second pattern.

In some embodiments, the projector includes a light-emitting diode or a laser diode.

From another aspect, embodiments of the present disclosure provide a 3D sensing method including: providing, by a projector, a light beam to a liquid crystal lens which applies a first pattern to the light beam to generate a first structured light; capturing, by an image sensor, a first image corresponding to the first structured light, and calculating first depth information according to the first pattern and the first image; determining if the first image satisfies a quality requirement; if the first image does not satisfy the quality requirement, controlling the liquid crystal lens such that the liquid crystal lens applies a second pattern to the light beam to generate a second structured light, and capturing, by the image sensor, a second image corresponding to the second structured light, wherein the second pattern is different from the first pattern; and calculating second depth information according to the second pattern and the second image, and combining the first depth information and the second depth information to generate a depth map.

In some embodiments, the step of determining if the first image satisfies the quality requirement includes: calculating first brightness of the first image, and calculating a difference between the first brightness and brightness of a previous image; and if the difference is greater than a threshold, determining that the first image does not satisfy the quality requirement.

In some embodiments, the first image includes multiple sensing areas, each of the sensing areas includes multiple dots, and the first pattern includes multiple first dots. The step of calculating first depth information according to the first pattern and the first image includes: matching the sensing areas and the first dots to calculate a depth value corresponding to each of the dots. The step of determining if the first image satisfies the quality requirement includes: for each of the sensing areas, determining if the sensing area is decoded successfully according to the corresponding depth values, and accordingly calculating a decoded rate of the first image; and if the decoded rate is less than a first threshold, determining that the first image does not satisfy the quality requirement.

In some embodiments, the 3D sensing method further includes: for each of the sensing areas, calculating a degree of difference according to the corresponding depth values; and if the degree of difference is greater than a second threshold, determining that the corresponding sensing area is not decoded successfully.

In some embodiments, the 3D sensing method further includes: dividing a number of the sensing areas which are decided successfully by a number of all of the sensing areas to calculate the decoded rate.

In some embodiments, the 3D sensing method further includes: dividing the second pattern into multiple second areas which corresponding to the sensing areas respectively; and distributing multiple dots in the second pattern such that a dot density of the second area corresponding to the sensing area which is decoded successfully is more than a dot density of the second area corresponding to the sensing area which is not decoded successfully.

In some embodiments, the 3D sensing method further includes: storing multiple predetermined patterns in a storage unit, wherein the first pattern and the second pattern are two of the predetermined patterns; and when the first image does not satisfy the quality requirement, selecting one of the predetermined patterns as the second pattern.

In some embodiments, the first pattern includes multiple first dots. The 3D sensing method includes: when the first image does not satisfy the quality requirement, shifting or rotating the first dots to generate the second pattern.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
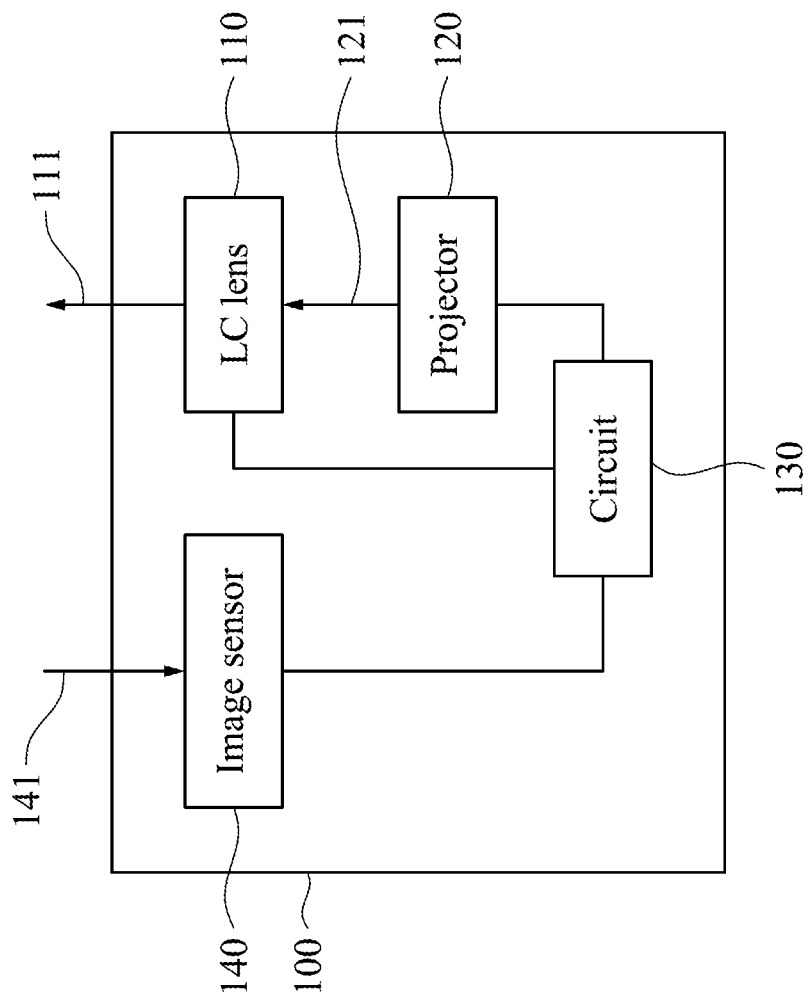
FIG. 1 is a schematic diagram of a 3D sensing system in accordance with an embodiment.

FIG. 1 is a schematic diagram of a 3D sensing system in accordance with an embodiment. Referring to FIG. 1, a 3D sensing system 100 includes a liquid crystal (LC) lens 110, a projector 120, a circuit 130, and an image sensor 140. The liquid crystal lens 110 is a device based on liquid crystal on silicon (LCOS) for orientating liquid-crystal molecules by voltages. The projector 120 may include a light-emitting unit or a laser unit such as an edge emitting laser (EEL), a vertical cavity surface emitting laser (VCSEL), or a photonic crystal surface emitting laser (OCSEL) which is not limited in the disclosure. The circuit 130 may be a central processing unit, a microprocessor, a microcontroller, a special application integrated circuit, or any circuit capable of computing. The image sensor 140 can sense visible light or invisible light, and the wavelength of the light is not limited in the disclosure. The image sensor 140 may include a charge-coupled device (CCD) sensor, a complementary metal-oxide semiconductor (CMOS) sensor or other suitable optical sensor. The circuit 130 is electrically connected to the liquid crystal lens 110, the projector 120, and the image sensor 140.

Figure 2:
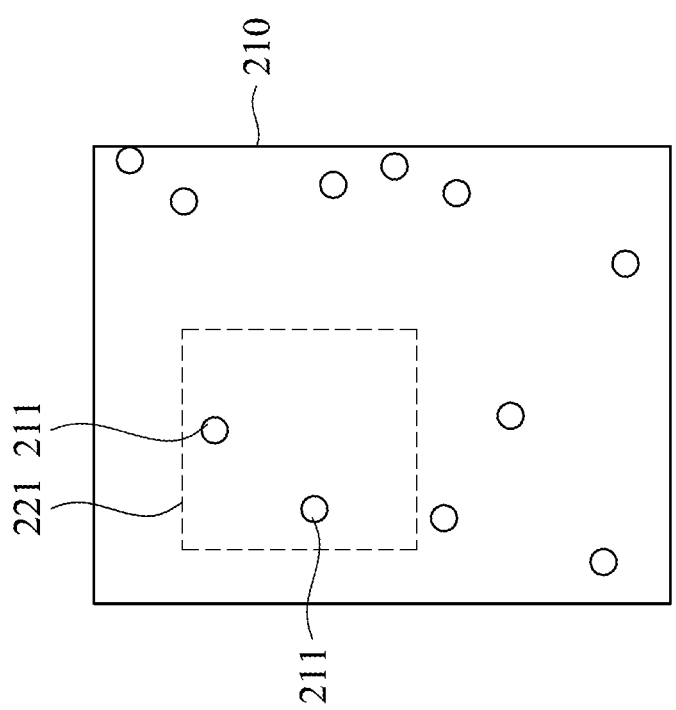
FIG. 2 is a diagram illustrating a portion of the first pattern in accordance with an embodiment.

The projector 120 provides a light beam 121 to the liquid crystal lens 110. The type of the light beam 121 may be a singular dot, multiple dots, line light, flood light, etc. which is not limited in the disclosure. The circuit 130 controls the liquid crystal lens 110 such that the liquid crystal lens 110 applies a first pattern to the light beam 121 to generate a first structured light 111. The first pattern, for example, includes multiple dots as shown in FIG. 2 in which a portion of a pattern 210 includes dots 211 that are irregularly distributed. In some embodiments, the projector 120 provides multiple dots, and the liquid crystal lens 110 can diffract each dot to generate more dots. FIG. 2 is merely an example, and the number of the dots of the pattern is not limited in the disclosure. In other embodiments, the first pattern may include multiple straight lines.

Figure 3:
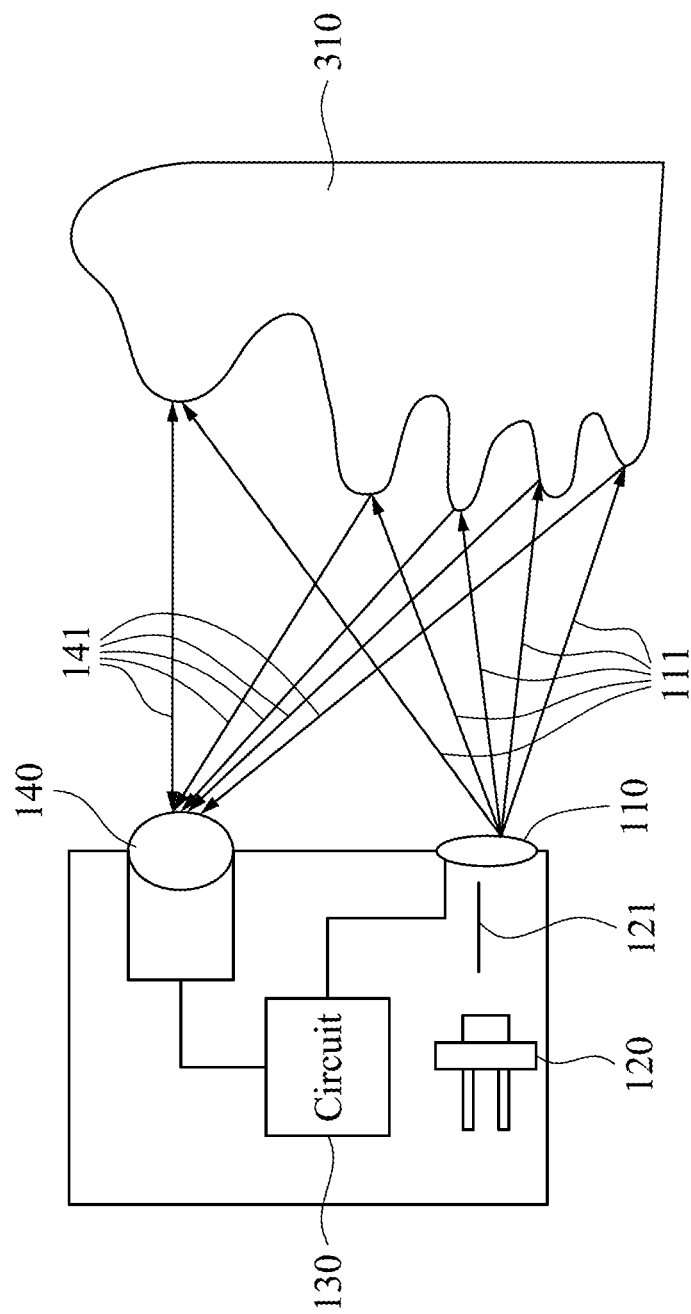
FIG. 3 is a schematic diagram of emitting structured light and sensing an image in accordance with an embodiment.

FIG. 3 is a schematic diagram of emitting structured light and sensing an image in accordance with an embodiment. Referring to FIG. 3, the first structured light 111 is projected onto an object 310 and then reflected by the object 310 (become reflected light 141) to the image sensor 140 which captures a first image according to the intensity of the reflected light 141. In other words, the first image corresponds to the first structured light 111.

Figure 4:
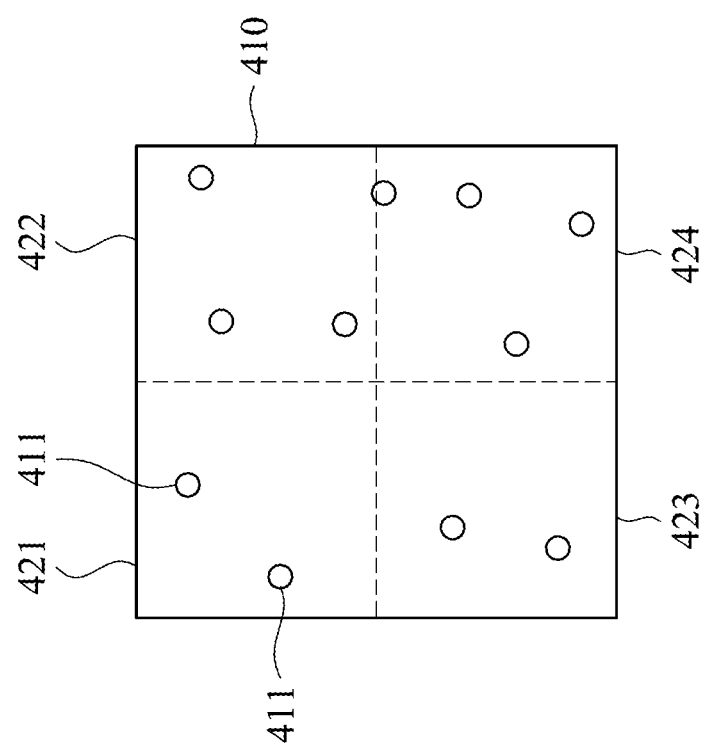
FIG. 4 is a schematic diagram of a portion of the first image in accordance with an embodiment.

After obtaining the first image, the circuit 130 calculates depth information according to the aforementioned first pattern and the first image. For example, FIG. 4 is a schematic diagram of a portion of the first image in accordance with an embodiment. Referring to FIG. 2 and FIG. 4, the first image 410 is divided into multiple sensing areas 421-424. Each sensing area includes multiple dots (e.g. dots 411). Since the dots are irregularly distributed in the first pattern 210, the dot distribution in each small region of the first pattern 210 is unique, and hence the dot distribution of each of the sensing areas 421-424 is also unique. Each of the sensing areas 421-424 may be matched to a certain area of the first pattern 210. For example, the sensing area 421 is matched to the area 221. The displacement of each dot can be calculated after matching, and therefore a depth value of each dot can be calculated according to the displacement. These depth values constitute the aforementioned depth information.

In the embodiment of FIG. 3, the object 310 has multiple notches that cannot be illuminated by the first structured light 111 and thus the corresponding depth value cannot be calculated. In the embodiment, the circuit 130 determines if the first image satisfies a quality requirement. The first pattern will be modified and projected again if the first image does not satisfy the quality requirement. The quality requirement may include determination of brightness or a decoded rate.

The determination of the decoded rate is described first. After calculating the depth value of each dot, a degree of difference among the depth values in each sensing area is calculated. If the degree of difference is greater than a second threshold, it means the corresponding sensing area is not decoded successfully. In some embodiment, a clustering algorithm (e.g. k-means algorithm or other suitable clustering algorithm) is performed to the depth values in the same sensing area (e.g. into two groups). Then, a difference between two centroids of the two groups is calculated as the degree of difference. In some embodiments, a standard deviation (or variance) of the depth values in the same sensing area is calculated as the degree of difference. In some embodiments, a sum of absolute difference between each depth value and a mean of the depth values is calculated as the degree of difference. In some embodiments, a median or a mode of the depth values in the same sensing area is calculated, and then a number of the depth values that differed from the median (or the mode) more than a threshold is calculated as the degree of difference. People in the skilled art should be able to devise another degree of difference based on the disclosure. In principle, a large degree of difference indicates inconsistent depth values in the same sensing area, which means that the object may have an edge, a notch, a bump, a reflecting region, an absorbing region, etc. The decoded rate is calculated by dividing the number of the sensing areas which are successfully decoded by the number of all the sensing areas. If the decoded rate is less than a first threshold, it is determined that the first image does not satisfy the quality requirement.

The determination of brightness is described herein. In some embodiments, a difference between brightness of the first image and brightness of a previous image is calculated. The previous image is captured before the first image. If the difference is greater than a threshold, it means that the light environment of the field has changed which may cause calculation error of the depth values. Therefore, when the difference of the brightness is greater than the threshold, it is determined that the first image does not satisfy the quality requirement. In some embodiments, the brightness may be total brightness or average brightness. The total brightness is defined as summation of grey levels of all pixels of the first image. The average brightness is defined as the average of the grey levels of all the pixels of the first image. In some embodiments, total brightness or average brightness of the first image is compared with one or multiple thresholds. The quality requirement is not satisfied if the total brightness or average brightness is greater than a high threshold or lower than a low threshold.

Figure 5:
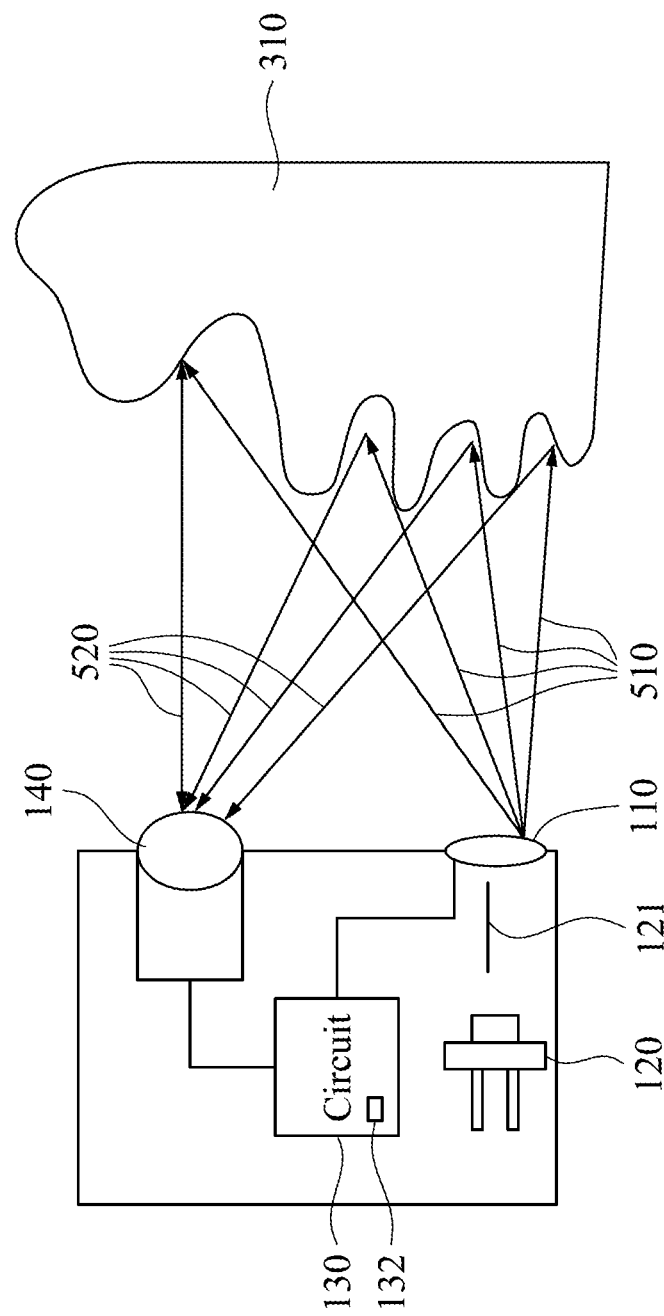
FIG. 5 is a schematic diagram of emitting the structured light and sensing the image for the second time in accordance with an embodiment.

FIG. 5 is a schematic diagram of emitting the structured light and sensing the image for the second time in accordance with an embodiment. Referring to FIG. 5, when the first image does not satisfy the quality requirement, the circuit 130 controls the liquid crystal lens 110 such that the liquid crystal lens 110 applies a second pattern to the light beam 121 to generate a second structured light 510. In particular, the second pattern is different from the first pattern. Therefore, the second structured light 510 can illuminate the regions which are not illuminated by the first structured light 111. The second structured light 510 will be reflected (become reflected light 520) to the image sensor 140 which captures a second image. In other words, the second image corresponds to the second structured light 510. Next, the circuit 130 calculates second depth information according to the second pattern and the second image (the process is identical to the calculation of the first depth information). The second depth information can compensate defects of the first depth information. The circuit 130 can combine the first depth information and the second depth information to generate a depth map. For example, if a pixel is successfully decoded in the first depth information but not in the second depth information, then the corresponding depth value of the first depth information is adopted; if a pixel is not successfully decoded in the first depth information but is successfully decoded in the second depth information, then the corresponding depth value of the second depth information is adopted; if a pixel is successfully decoded in both of the first and second depth information, the two corresponding depth values may be averaged. All of the pixels (i.e. depth values) constitute the aforementioned depth map.

In some embodiments, the circuit 130 includes a storage unit 132 storing multiple predetermined patterns. The aforementioned first and second patterns belong to the predetermined patterns. When the first image does not satisfy the quality requirement, one of the other predetermined patterns is randomly selected as the second pattern.

In some embodiments, the second pattern is determined dynamically. To be specific, the second pattern is divided into multiple second areas. The locations of the second patterns are identical to the sensing areas 421-424 of FIG. 4 respectively. A sensing area may not be decoded successfully due to too many dots or too less dots. Too many dots may overlap with each other, reducing contrast, and therefore need to decrease the number of the dots. On the other hand, too less dots may not be able to illuminate a notch and therefore need to increase the number of the dots. When a sensing area is not decoded successfully, whether the dots of the sensing area overlap with each other is determined, and if affirmative, then the dot density of the second area corresponding to this sensing area is decreased; otherwise the dot density of the corresponding second area is increased. For example, assume the sensing area 421 is not decoded successfully, and the sensing area 422 is decoded successfully. If the dots of the sensing area 421 overlap with each other, then the dot density of the second area corresponding to the sensing area 421 is smaller than that of the sensing area 422, otherwise the dot density of the second area corresponding to the sensing area 421 is relatively larger.

Figure 6:
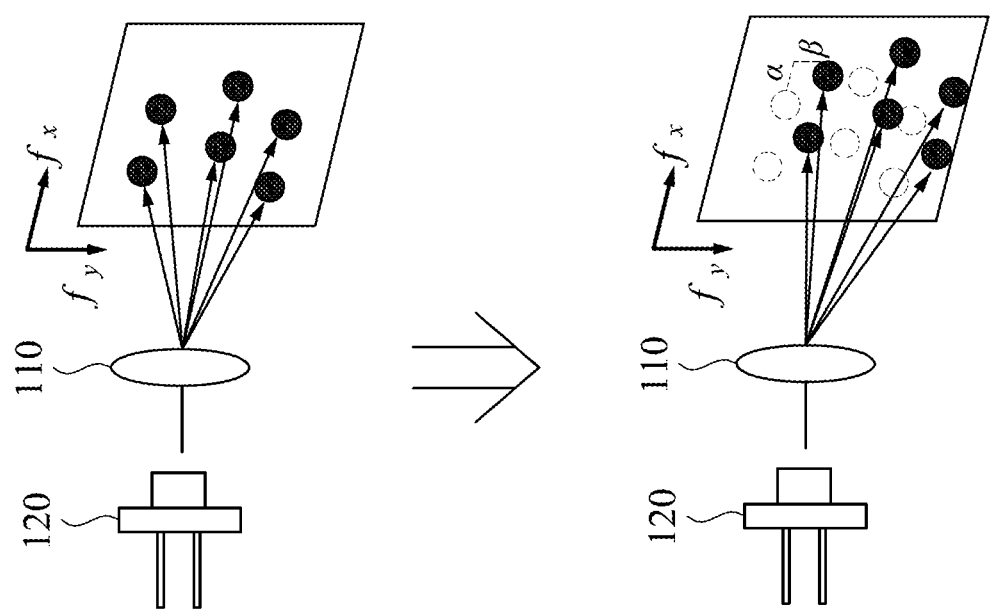
FIG. 6 is a schematic diagram of shifting the dots in accordance with an embodiment.

In some embodiments, when the first image does not satisfy the quality requirement, the circuit 130 may shift or rotate the dots of the first pattern to generate the second pattern. FIG. 6 is a schematic diagram of shifting the dots in accordance with an embodiment. Referring to FIG. 6, the upper diagram illustrates the situation before the shifting, the bottom diagram illustrates after the shifting. Assume F $(f_x, f_y)$ is travel direction of the light beam passing through the liquid crystal lens 110. $f(x, y)$ is a transfer function of the liquid crystal lens 110. It leads to the following equation.

$$F(f_x, f_y) = \mathcal{F}\{f(x, y)\} \qquad [\text{Equation 1}]$$

In the equation, $\mathcal{F}\{\ \}$ is the Fourier transform. The shift between the spatial domain and the frequency domain is written in the following equation 2.

$$F(f_x - \alpha, f_y - \beta) = \mathcal{F}\{f(x, y) \cdot \exp[i(\alpha x + \beta y)]\} \qquad [\text{Equation 2}]$$

Therefore, the term of $\exp[i(\alpha x + \beta y)]$ is added to the transfer function of the liquid crystal lens 110 such that the light beam is shifted $\alpha$ and $\beta$ in the direction $f_x$ and $f_y$ respectively. People in the art should be able to appreciate the principle of the liquid crystal lens 110 and far-field diffraction. The calculation of rotation will not be described herein.

Figure 7:
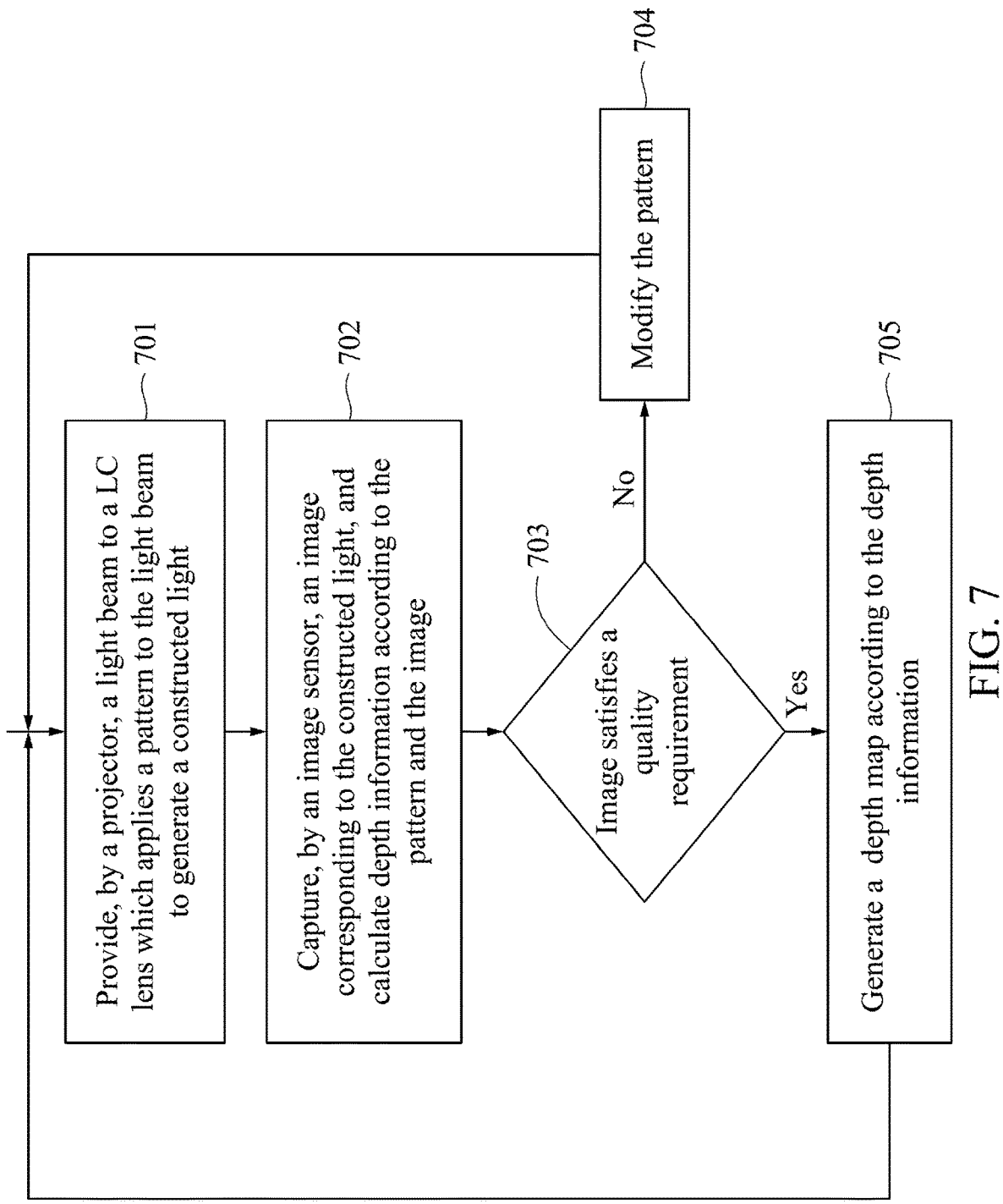
FIG. 7 is a flow chart of a 3D sensing method in accordance with an embodiment.

FIG. 7 is a flow chart of a 3D sensing method in accordance with an embodiment. Referring to FIG. 7, in step 701, the projector 120 provides a light beam is provided to the liquid crystal lens 110 which applies a pattern to the light beam to generate a structured light. In step 702, the image sensor 140 captures an image corresponding to the structured light and depth information is calculated according to the pattern and the image. In step 703, whether the image satisfies a quality requirement is determined. If the image does not satisfy the quality requirement, in step 704, the pattern is modified and the steps 701 and 702 are repeated. If the image satisfies the quality requirement, in step 705, a depth map is generated according to the depth information. If only one image is captured, then the depth information is identical to the depth map. If more than one images are captured, then the depth information is combined to generate the depth map. After the step 705, it processes the next image and goes back to the step 701. All the steps in FIG. 7 have been described in detail above, and therefore the description will not be repeated. Note that the steps in FIG. 7 can be implemented as program codes or circuits, and the disclosure is not limited thereto. In addition, the method in FIG. 7 can be performed with the aforementioned embodiments, or can be performed independently. In other words, other steps may be inserted between the steps of the FIG. 7.

In some embodiments, the step 703 is performed for every image. In other embodiments, the step 703 is performed every few images, or when to perform the step 703 is determined randomly which is not disclosed in the disclosure. In some embodiments, the circuit 130 may be implemented as multiple computation units including an integrated circuit in the 3D sensing system 100 and an external computer. In other words, one or more of the steps 702-704 may be performed by the external computer.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A 3D (3 dimensions) sensing system, comprising:
a liquid crystal lens;
a projector configured to provide a light beam to the liquid crystal lens which applies a first pattern to the light beam to generate a first structured light;
an image sensor configured to capture a first image corresponding to the first structured light; and
a circuit electrically connected to the image sensor, the liquid crystal lens, and the projector, wherein the circuit is configured to calculate first depth information according to the first pattern and the first image, and determine if the first image satisfies a quality requirement,
wherein if the first image does not satisfy the quality requirement, the circuit is configured to control the liquid crystal lens such that the liquid crystal lens applies a second pattern to the light beam to generate a second structured light, and the image sensor is configured to capture a second image corresponding to the second structured light, wherein the second pattern is different from the first pattern,
wherein the circuit is configured to calculate second depth information according to the second pattern and the second image, and combine the first depth information and the second depth information to generate a depth map;
wherein the second pattern is different from the first pattern to enable the second structured light to illuminate regions which are not illuminated by the first structured light.

2. The 3D sensing system of claim 1, wherein the circuit is further configured to calculate first brightness of the first image, and calculate a difference between the first brightness and brightness of a previous image,
if the difference is greater than a threshold, the circuit is configured to determine that the first image does not satisfy the quality requirement.

3. The 3D sensing system of claim 1, wherein the circuit is further configured to determine that the first image does not satisfy the quality requirement if brightness of the first image is greater than a high threshold or less than a low threshold.

4. The 3D sensing system of claim 1, wherein the first image comprises a plurality of sensing areas, each of the sensing areas comprises a plurality of dots, and the first pattern comprises a plurality of first dots,
wherein the circuit is configured to match the sensing areas and the first dots to calculate a depth value corresponding to each of the dots,
wherein for each of the sensing areas, the circuit is configured to determine if the sensing area is decoded successfully according to the corresponding the depth values, and accordingly calculate a decoded rate of the first image,
wherein if the decoded rate is less than a first threshold, the circuit is configured to determine that the first image does not satisfy the quality requirement.

5. The 3D sensing system of claim 4, wherein for each of the sensing areas, the circuit is configured to calculate a degree of difference according to the corresponding depth values,
wherein if the degree of difference is greater than a second threshold, the circuit is configured to determine that the corresponding sensing area is not decoded successfully.

6. The 3D sensing system of claim 5, wherein the circuit is configured to divide a number of the sensing areas which are decided successfully by a number of all of the sensing areas to calculate the decoded rate.

7. The 3D sensing system of claim 6, wherein the circuit is configured to divide the second pattern into a plurality of second areas which corresponding to the sensing areas respectively,
the circuit is configured to distribute a plurality of dots in the second pattern such that a dot density of the second area corresponding to the sensing area which is decoded successfully is more than a dot density of the second area corresponding to the sensing area which is not decoded successfully.

8. The 3D sensing system of claim 1, wherein the circuit is configured to store a plurality of predetermined patterns in a storage unit, and the first pattern and the second pattern are two of the predetermined patterns, wherein when the first image does not satisfy the quality requirement, the circuit is configured to select one of the predetermined patterns as the second pattern.

9. The 3D sensing system of claim 1, wherein the first pattern comprises a plurality of first dots,
wherein when the first image does not satisfy the quality requirement, the circuit is configured to shift or rotate the first dots to generate the second pattern.

10. The 3D sensing system of claim 1, wherein the projector comprises a light-emitting diode or a laser diode.

11. A 3D sensing method for a circuit, wherein the 3D sensing method comprises:
providing, by a projector, a light beam to a liquid crystal lens which applies a first pattern to the light beam to generate a first structured light;
capturing, by an image sensor, a first image corresponding to the first structured light, and calculating first depth information according to the first pattern and the first image;
determining if the first image satisfies a quality requirement;
if the first image does not satisfy the quality requirement, controlling the liquid crystal lens such that the liquid crystal lens applies a second pattern to the light beam to generate a second structured light, and capturing, by the image sensor, a second image corresponding to the second structured light, wherein the second pattern is different from the first pattern; and
calculating second depth information according to the second pattern and the second image, and combining the first depth information and the second depth information to generate a depth map;
wherein the second pattern is different from the first pattern to enable the second structured light to illuminate regions which are not illuminated by the first structured light.

12. The 3D sensing method of claim 11, wherein the step of determining if the first image satisfies the quality requirement comprises:
calculating first brightness of the first image, and calculating a difference between the first brightness and brightness of a previous image; and
if the difference is greater than a threshold, determining that the first image does not satisfy the quality requirement.

13. The 3D sensing method of claim 12, wherein the step of determining if the first image satisfies the quality requirement comprises:
determining that the first image does not satisfy the quality requirement if brightness of the first image is greater than a high threshold or less than a low threshold.

14. The 3D sensing method of claim 11, wherein the first image comprises a plurality of sensing areas, each of the sensing areas comprises a plurality of dots, the first pattern comprises a plurality of first dots, and the step of calculating first depth information according to the first pattern and the first image comprises:
matching the sensing areas and the first dots to calculate a depth value corresponding to each of the dots,
wherein the step of determining if the first image satisfies the quality requirement comprises:
for each of the sensing areas, determining if the sensing area is decoded successfully according to the corresponding the depth values, and accordingly calculating a decoded rate of the first image; and
if the decoded rate is less than a first threshold, determining that the first image does not satisfy the quality requirement.

15. The 3D sensing method of claim 14, further comprising:
for each of the sensing areas, calculating a degree of difference according to the corresponding depth values; and
if the degree of difference is greater than a second threshold, determining that the corresponding sensing area is not decoded successfully.

16. The 3D sensing method of claim 15, further comprising:
dividing a number of the sensing areas which are decided successfully by a number of all of the sensing areas to calculate the decoded rate.

17. The 3D sensing method of claim 16, further comprising:
dividing the second pattern into a plurality of second areas which corresponding to the sensing areas respectively; and
distributing a plurality of dots in the second pattern such that a dot density of the second area corresponding to the sensing area which is decoded successfully is more than a dot density of the second area corresponding to the sensing area which is not decoded successfully.

18. The 3D sensing method of claim 11, further comprising:
storing a plurality of predetermined patterns in a storage unit, wherein the first pattern and the second pattern are two of the predetermined patterns; and
when the first image does not satisfy the quality requirement, selecting one of the predetermined patterns as the second pattern.

19. The 3D sensing method of claim 11, wherein the first pattern comprises a plurality of first dots, and the 3D sensing method comprises:
when the first image does not satisfy the quality requirement, shifting or rotating the first dots to generate the second pattern.

* * * * *